United States Patent
Harpaz et al.

(10) Patent No.: US 6,565,291 B2
(45) Date of Patent: *May 20, 2003

(54) CUTTING TOOL ASSEMBLY

(75) Inventors: Jacob Harpaz, Kfar Vradim (IL); Amir Satran, Kfar Vradim (IL); Andrei Petrilin, Qiryat Ata (IL)

(73) Assignee: Iscar, Ltd. (IL)

( * ) Notice: Subject to any disclaimer, the term of this patent is extended or adjusted under 35 U.S.C. 154(b) by 81 days.

This patent is subject to a terminal disclaimer.

(21) Appl. No.: 09/931,928

(22) Filed: Aug. 20, 2001

(65) Prior Publication Data

US 2002/0021945 A1 Feb. 21, 2002

Related U.S. Application Data

(63) Continuation-in-part of application No. 09/895,299, filed on Jul. 2, 2001, now Pat. No. 6,494,648.

(30) Foreign Application Priority Data

Aug. 18, 2000  (IL) ................................................ 137945

(51) Int. Cl.$^7$ ................................................ B26D 1/12
(52) U.S. Cl. ................ 407/53; 407/30; 408/233
(58) Field of Search .............................. 407/30, 53, 34, 407/33, 46; 408/233, 238, 239 R; 279/83, 103

(56) References Cited

U.S. PATENT DOCUMENTS

| | | | |
|---|---|---|---|
| 5,114,286 A | 5/1992 | Calkins ........................ 408/226 |
| 5,899,642 A | 5/1999 | Berglow et al. ............... 407/40 |
| 5,971,670 A | 10/1999 | Pantzar et al. ................ 407/34 |
| 6,394,711 B1 * | 5/2002 | Brosius ........................ 408/57 |

FOREIGN PATENT DOCUMENTS

EP          0 298 937 B1    10/1992

* cited by examiner

*Primary Examiner*—Kien T. Nguyen
(74) *Attorney, Agent, or Firm*—Pennie & Edmonds LLP

(57) ABSTRACT

The present invention provides a cutting tool assembly having a tool shank with an elongated hole extending axially through the tool shank. An elongated support bar having threaded bore at its forward end is retained in the elongated hole. A cutting head having a forward cutting portion and a rear threaded portion is retained in the support bar with its rear threaded portion threadingly engaged with the threaded bore in the forward end of the support bar.

20 Claims, 6 Drawing Sheets

CUTTING TOOL ASSEMBLY

RELATED APPLICATIONS

This application is a Continuation-in-part of U.S. application Ser. No. 09/895,299, filed Jul. 2, 2001 U.S. Pat. No. 6,494,648.

FIELD OF THE INVENTION

This invention relates generally to cutting tool assemblies for metal cutting machining having a replaceable cutting head, and more particularly to cutting tool assemblies having an elongated shank for rotary cutting operations.

BACKGROUND OF THE INVENTION

Cutting tool assemblies having an elongated shank for rotary cutting operations have long been known. It has been proposed in EP 0 298 937 B1, to provide a cutting tool comprising a cutting body and a shaft that supports the cutting body. The cutting body is detachably connected to a locking screw via hook-shaped means. The hooked-shaped means transfers axial forces between the cutting body and the locking screw. Both the cutting body and the locking screw are provided with hook shaped means. Both of the hooked shaped means are provided with recesses and tongues. The recesses and tongues cooperate to permanently transfer rotational movement between the locking means and the cutting body. The locking screw is provided with an externally threaded portion that is connected to an internally threaded recess provided in the shaft. The threads are designed as right hand threads for right hand cutting tools and as left hand threads for left hand cutting tools. The locking screw is movable in the axial direction by relative rotation of the externally threaded portion with respect to the internally threaded recess. The shaft is provided with a conical seat and the cutting body is provided with a circumferential conical portion that is received in the conical seat of the shaft. The cutting body can be inserted in or removed from the conical seat by displacing the locking screw from its innermost position to an intermediate position.

The prior art cutting tool described above suffers from two basic disadvantages. First, to insert or remove the cutting body from the shaft the locking screw has to be displaced from its innermost position to an intermediate position. Second, the cutting body cannot be used in any other type of tool since it is formed with hook-shaped member and therefore it requires the presence of a locking screw having a mating hook-shaped member for coupling it to the shaft.

It is an object of the present invention to provide a cutting tool assembly that substantially overcomes the above-mentioned disadvantages.

SUMMARY OF THE INVENTION

In accordance with the present invention there is provided a cutting tool assembly comprising:

a tool shank having a forward end, a rear end and a longitudinal axis A passing through the forward and rear ends, an elongated hole extending axially from the forward end of the tool shank, adjacent the forward end of the tool shank the elongated hole having a conical portion, the tool shank having a first coupling member adjacent the rear end thereof;

an elongated support bar having a forward end and a rear end, with a threaded bore extending axially rearwardly from the forward end thereof, the elongated support bar having a conical portion rearward of the forward end thereof, the elongated support bar having a second coupling member adjacent the rear end thereof, the elongated support bar being removably retained in the elongated hole of the tool shank with the first coupling member coupled to the second coupling member and with at least a section of the conical portion of the elongated support bar being in abutment with the conical portion of the elongated hole; and a cutting head having a forward cutting portion and a rear threaded portion; the rear threaded portion of the cutting head being threadingly engaged with the threaded bore in the forward end of the elongated support bar.

In accordance with a first embodiment of the present invention, the elongated hole has a threaded portion adjacent the rear end thereof and wherein the elongated support bar has an externally threaded portion adjacent the rear end thereof and wherein the elongated support bar is removably retained in the elongated hole of the tool shank with the externally threaded portion of the elongated support bar threadingly engaged with the threaded portion of the elongated hole, the threaded portion of the elongated hole forming the first coupling member and the externally threaded portion of the elongated support bar forming the second coupling member.

In accordance with a second embodiment of the present invention, the tool shank has a threaded through bore passing through a section of the tool shank, the threaded through bore extending from a side opening in the tool shank to the elongated hole, the elongated support bar being removably retained in the elongated hole of the tool shank by a securing screw threadingly retained in the threaded through bore, the securing screw engaging a locking recess formed in the elongated support bar, the securing screw forming the first coupling member and the locking recess of the elongated support bar forming the second coupling member.

In accordance with a third embodiment of the present invention, the cutting tool assembly further comprises a coupling bar generally cylindrically shaped at least a portion of which has an externally threaded surface and having an axially extending through bore with an internally threaded portion, wherein the elongated hole has a threaded portion adjacent the rear end of the tool shank and wherein the elongated support bar has an externally threaded portion adjacent the rear end thereof and wherein the coupling bar is removably retained in the elongated hole of the tool shank adjacent the rear end thereof with the externally threaded surface of the coupling bar threadingly engaged with the threaded portion of the elongated hole and the elongated support bar is removably retained in the elongated hole with the externally threaded portion of the elongated support bar threadingly engaged with the internally threaded portion of the coupling bar, the internally threaded portion of the coupling bar forming the first coupling member and the externally threaded portion of the elongated support bar forming the second coupling member.

In accordance with a fourth embodiment of the present invention, the cutting tool assembly further comprises a cylindrical sleeve having a non-threaded external cylindrical surface and an axially extending threaded through bore and wherein the elongated hole in the tool shank has a cylindrically shaped rear portion in which the cylindrical sleeve is mounted and wherein the elongated support bar is removably retained in the elongated hole with the externally threaded portion of the elongated support bar in threaded engagement with the threaded through bore in the cylindrical sleeve, the threaded through bore in the cylindrical sleeve forming the first coupling member and the externally threaded portion of the elongated support bar forming the second coupling member.

In accordance with a fifth embodiment of the present invention, the cutting tool assembly further comprises a cylindrical sleeve having a non-threaded external cylindrical surface and an axially extending threaded through bore and wherein the elongated hole in the tool shank has a cylindrically shaped rear portion in which the cylindrical sleeve is mounted and wherein the cutting tool assembly further comprises a coupling bar generally cylindrically shaped, at least a portion having an externally threaded surface and having an axially extending through bore with an internally threaded portion, and the coupling bar is removably retained in the cylindrical sleeve with the externally threaded surface of the coupling bar in threaded engagement with the threaded through bore of the cylindrical sleeve and the elongated support bar is removably retained in the elongated hole of the tool shank with the externally threaded portion of the support bar in threaded engagement with the internally threaded portion of the coupling bar, the internally threaded portion of the coupling bar forming the first coupling member and the externally threaded portion of the elongated support bar forming the second coupling member.

If desired, the elongated support bar is provided with a coolant channel for conducting a coolant fluid, the coolant channel extending axially from the rear end to the forward end of the elongated support bar, and the cutting head is provided with a coolant channel extending through the rear threaded portion thereof and exiting the cutting head at exit openings formed in the forward cutting portion thereof.

If desired, the tool shank of the fourth or fifth embodiments of the present invention is made of cemented carbide.

Typically, the cylindrical sleeve is mounted in the tool shank by heat shrink-fit techniques.

Further typically, the cylindrical sleeve is mounted in the tool shank by soldering.

BRIEF DESCRIPTION OF THE DRAWINGS

For a better understanding the invention will now be described, by way of example only, with reference to the accompanying drawings in which.

DETAILED DESCRIPTION OF THE INVENTION

Figure 1:
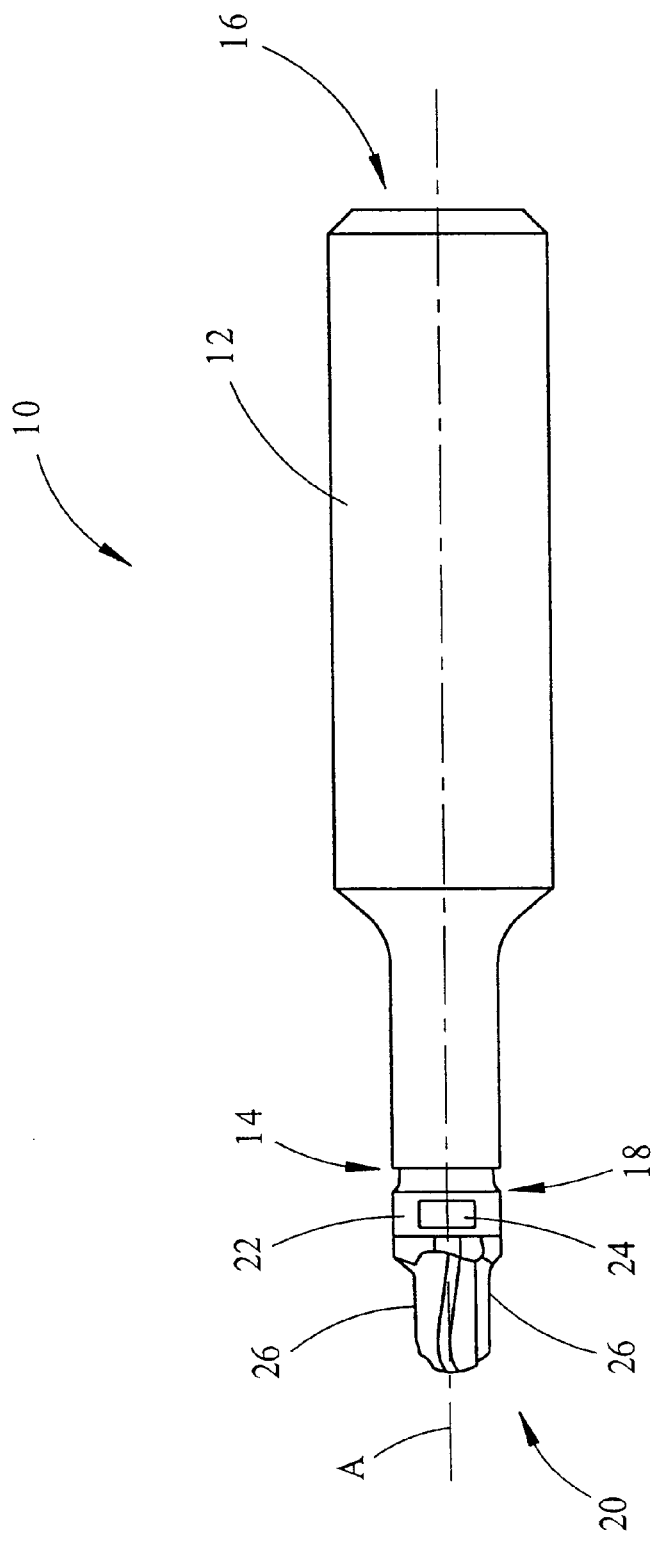
FIG. 1 is a side view of a cutting tool assembly in accordance with the present invention.

Attention is drawn to the drawings in general and to FIG. 1 in particular, showing a cutting tool assembly 10 in accordance with the present invention. In all the drawings the same reference numerals are used to denote identical or similar parts. The cutting tool assembly 10 comprises a tool shank 12 having a forward end 14, a rear end 16 and a longitudinal axis A passing through the forward and rear ends. The tool shank 12 has generally rotational symmetry about the longitudinal axis A. The tool shank 12 comprises a forward portion and rear portion, wherein the diameter of the forward portion is preferably smaller than the diameter of the rear portion. As will be described below in greater detail with respect to specific embodiments of the invention, an elongated support bar 18 is removably retained in the tool shank 12 and a cutting head 20 is removably retained in the elongated support bar 18.

The elongated support bar 18 has a forward end 34 and a rear end 36 and preferably has a cylindrical end portion 22 adjacent the forward end 34. The cylindrical end portion 22 is preferably provided with diametrically opposite flat surfaces 24 for receiving the jaws of a spanner for tightening or loosening the elongated support bar. Similarly, the cutting head 20 is preferably provided with diametrically opposite flat surfaces 26 for receiving the jaws of a spanner for tightening or loosening the cutting head. Generally, the cutting head 20 is made of cemented carbide. The material from which the tool shank 12 is fabricated generally depends on working conditions, tool life and tool accuracy requirements. Typically, the tool shank is made from alloy steel. However, to reduce vibrations, the tool shank is preferably made of a heavy metal such as Tungsten or a Tungsten alloy, or even from a cemented carbide such as Tungsten carbide. As will be explained in greater detail below with respect to FIGS. 5 and 6, the use of a cemented carbide tool shank requires certain modifications in the design of the tool shank as compared with a tool shank made from softer materials.

Although the cylindrical end portion 22 is shown to be of relatively short length in comparison to the overall length of the elongated support bar 18, this is for illustrational purposes only and it should not be construed as a constraint. In practice, the actual length of the cylindrical end portion 22 is determined by, inter alia, machining requirements. Hence, for a given tool shank 12, the elongated support bar 18 forms an adaptor for using different cutting heads 20 in the cutting tool assembly 10, wherein the length of the cutting tool assembly can be varied by choosing elongated support bars 18 having cylindrical end portions 22 of different lengths.

Figure 2:
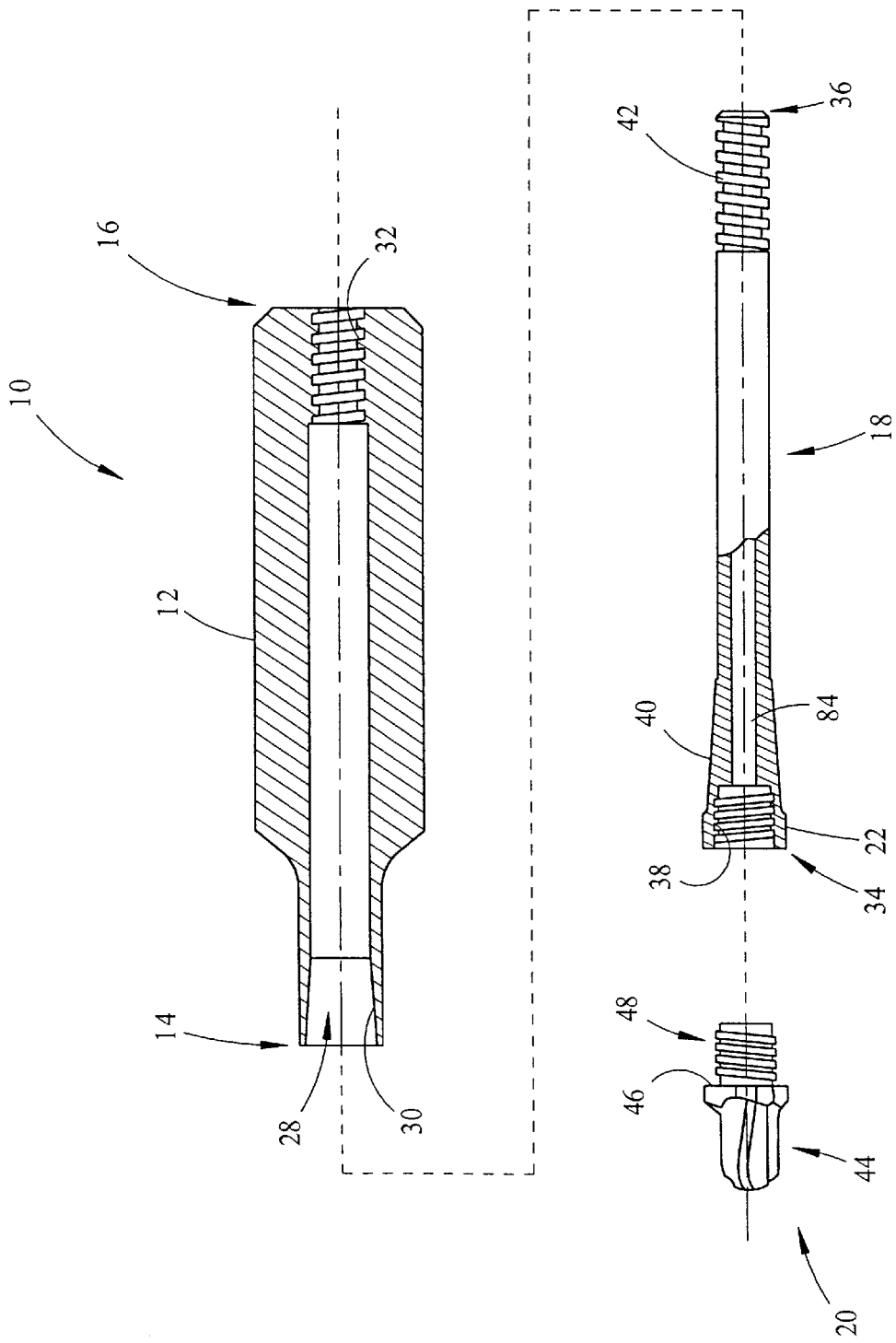
FIG. 2 is a partially sectioned exploded side view of a first embodiment of the cutting tool assembly shown in FIG. 1.

Attention is now drawn to FIG. 2 showing a partially sectioned exploded side view of a first embodiment of the cutting tool assembly 10 of the present invention. An elongated hole 28 extends axially from the forward end 14 to the rear end 16 of the tool shank 12. The elongated hole 28 has a conical portion 30 adjacent the forward end 14 of the tool shank and a threaded portion 32 adjacent the rear end 16 of the tool shank 12. The conical portion 30 tapers rearwardly from the forward end 14 of the tool shank 12. The section of the elongated hole 28 rearward of the conical portion 30 is preferably cylindrical. The threaded portion 32 forms a first coupling member of the cutting tool assembly 10.

A threaded bore 38 extends rearwardly from the forward end 34 of the elongated support bar 18. The elongated support bar 18 has a conical portion 40 rearward of the forward end 34 thereof. The conical portion 40 tapers rearwardly, preferably, from adjacent the cylindrical portion 22. The section of the elongated support bar 18 rearward of the conical portion 40 is preferably cylindrical. Also shown in FIG. 2 is the cylindrical end portion 22 between the forward end 34 and the conical portion 40. The elongated support bar 18 has an externally threaded portion 42 adjacent the rear end 36 thereof. The externally threaded portion 42 constitutes a second coupling member of the cutting tool assembly 10. The cutting head 20 has a forward cutting portion 44, with a rearwardly facing abutment surface 46, and a rear threaded portion 48.

In the assembled cutting tool assembly 10 in accordance with the first embodiment of the invention, the elongated support bar 18 is removably retained in the elongated hole 28 of the tool shank 12 with the externally threaded portion 42 in threaded engagement with the threaded portion 32 of the elongated hole 28 and at least a section of the conical portion 40 of the elongated support bar 18 in abutment with the conical portion 30 of the elongated hole 28. The cutting head 20 is removably retained in the elongated support bar 18 with the rear threaded portion 48 in threaded engagement with the threaded bore 38 in the forward end 34 of the support bar 18. When the threaded engagement is complete, that is when the cutting head is fully tightened in position, the rearwardly facing abutment surface 46 abuts the forward end 34 of the elongated support bar 18, as shown in FIG. 1.

Figure 3:
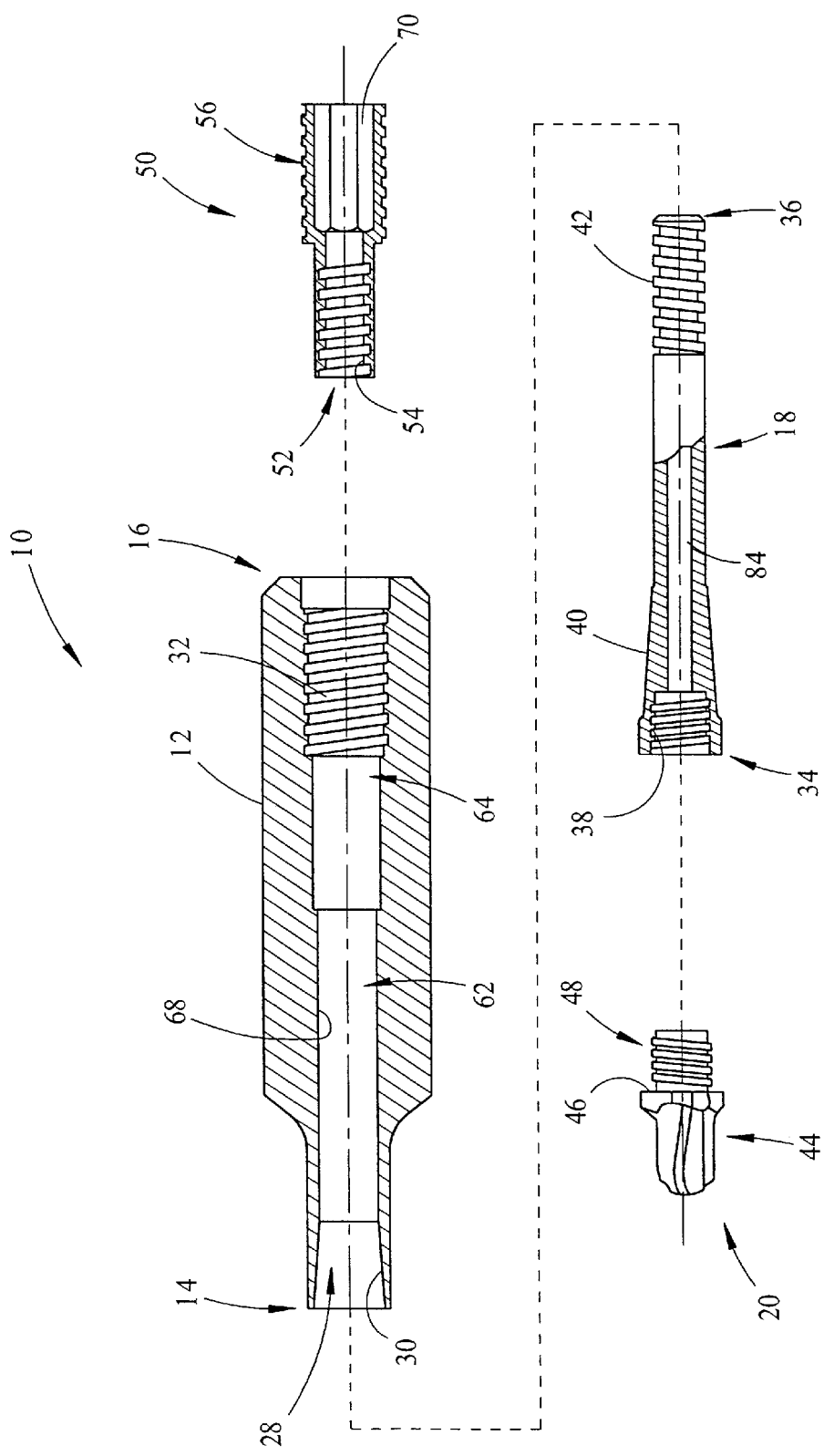
FIG. 3 is a partially sectioned exploded side view of a second embodiment of the cutting tool assembly shown in FIG. 1.

Attention is now drawn to FIG. 3 showing a partially sectioned exploded side view of a second embodiment of the cutting tool assembly 10 of the present invention. The cutting head 20 and the elongated support bar 18 are similar to those of the first embodiment. In accordance with the second embodiment, the cutting tool assembly 10 further comprises a coupling bar 50 having the form of a bushing with a generally cylindrical shape and with an axially extending through bore 52. The coupling bar 50 comprises an internally threaded portion 54 on part of the through bore 52 and an externally threaded surface 56 covering at least a portion of the coupling bar 50. The diameter of the externally threaded surface 56 is greater than the diameter of the internally threaded portion 54. The internally threaded portion 54 has the same thread and internal diameter as the threaded portion 32 of the elongated hole 28 of the tool shank of the first embodiment. Therefore, the internally threaded portion 54 of the coupling bar 50 is capable of threadingly engaging the externally threaded portion 42 of the elongated support bar 18.

In accordance with the second embodiment, the cutting tool assembly has a tool shank 12 with an elongated hole 28 extending axially between the forward and rear ends thereof. The elongated hole 28 comprises two portions, a forward portion 62 and a rear portion 64. The forward portion 62 has a conical portion 30 adjacent the forward end 14 of the tool shank 12 and a cylindrical portion 68 extending rearwardly from the conical portion 30. The rear portion 64 of the elongated hole 28 is cylindrical in shape and has a diameter that is preferably larger than the diameter of the cylindrical portion 68 of the forward portion 62. The rear portion 64 of the elongated hole 28 has a threaded portion 32 adjacent the rear end 16 of the tool shank 12. The threaded portion 32 is capable of threadingly engaging the externally threaded surface 56 of the coupling bar 50. A portion of the through bore 52 adjacent the rear end of the coupling bar 50 forms a socket 70 suitably shaped to receive a key, such as an Allen key, for screwing the coupling member 50 into the tool shank 12. The internally threaded portion 54 extends rearwardly from the forward end of the coupling bar 50 to the socket 70. In accordance with the second embodiment, the internally threaded portion 54 of the coupling bar 50 constitutes a first coupling member and the externally threaded portion 42 of the elongated support bar 18 constitutes a second coupling member of the cutting tool assembly 10.

In the assembled cutting tool assembly 10 in accordance with the second embodiment of the invention, the coupling bar 50 is removably retained in the rear portion 64 of the elongated hole 28 with the externally threaded surface 56 of the coupling bar 50 in threaded engagement with the threaded portion 32 of the rear portion 64 of the elongated hole 28. The elongated support bar 18 is removably retained in the elongated hole 28 of the tool shank 12 with the externally threaded portion 42 in threaded engagement with the internally threaded portion 54 of the coupling bar 50 and at least a section of the conical portion 40 of the elongated support bar 18 in abutment with the conical portion 30 of the elongated hole 28. The cutting head 20 is removably retained in the elongated support bar 18 with the rear threaded portion 48 in threaded engagement with the threaded bore 38 in the forward end of the support bar 18. When the threaded engagement is complete, that is when the cutting head is fully tightened in position, the rearwardly facing abutment surface 46 abuts the forward end of the elongated support bar 18. Although, in accordance with the second embodiment, the coupling bar 50 is shown to be externally threaded on a rear portion thereof, this arrangement is by no means binding and the coupling bar 50 can be externally threaded on any convenient portion. If desired, the whole of the coupling bar 50 can be externally threaded, as will be illustrated below in FIG. 6 with reference to a fifth embodiment of the invention. Clearly, the location and length of the threaded portion 32 of the of the rear portion of the elongated hole 28 of the tool shank 12 have to be appropriately designed so as to be able to threadingly engage the externally threaded surface of the coupling bar.

Figure 4:
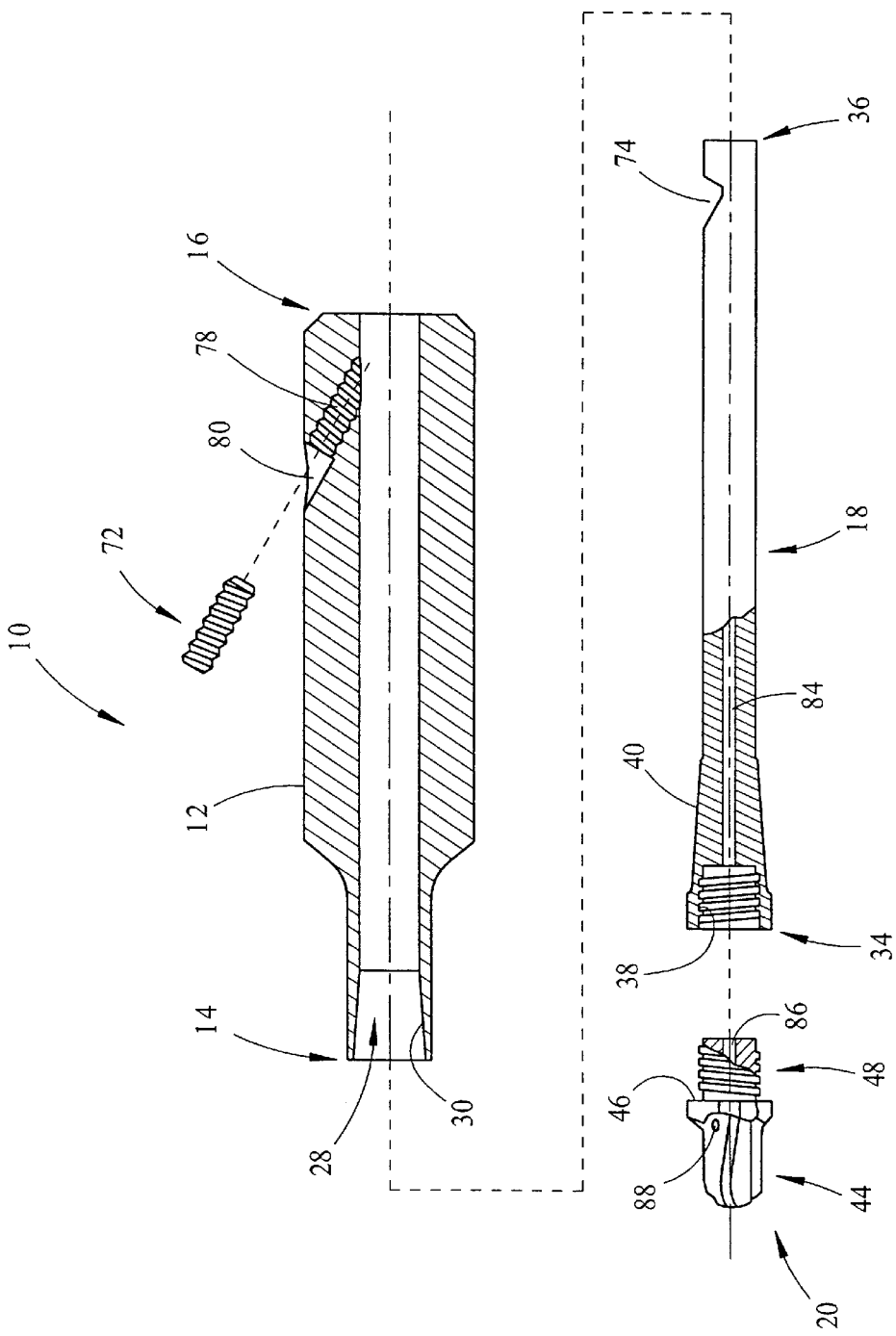
FIG. 4 is a partially sectioned exploded side view of a third embodiment of the cutting tool assembly shown in FIG. 1.

Attention is now drawn to FIG. 4 showing a partially sectioned exploded side view of a third embodiment of the cutting tool assembly 10 of the present invention. In accordance with the third embodiment the first coupling member is a securing screw 72 and the second coupling member is a locking recess 74. The tool shank 12 has a threaded through bore 78 passing through a section of the tool shank, the threaded through bore 78 extends from a side opening 80 in the tool shank to the elongated hole 28. The side opening 80 can be located at any point rearward of the forward end 14 of the tool shank, but it is preferably located adjacent the rear end 16 of the tool shank 12. The elongated support bar 18 is removably retained in the elongated hole 28 of the tool shank 12 by the securing screw 72 which is threadingly engaged with the threaded through bore 78 and which engages the locking recess 74 in the elongated support bar 18.

If desired, the elongated support bar 18 is provided with a coolant channel 84 for conducting a coolant fluid, the coolant channel extending axially from the rear end 36 of the elongated support bar 18 to the threaded bore 38 in the forward end 34 of the elongated support bar 18. Further if desired, the cutting head 20 is provided with a coolant channel 86 extending through the rear threaded portion 48 thereof and exiting the cutting head at exit openings 88 formed in the forward cutting portion 44 thereof.

The three embodiments described above all require internal threading of the tool shank. However, as mentioned above, for some applications it is desirable to fabricate the tool shank from cemented carbide such as Tungsten carbide. Due to the difficulty involved in forming an internal thread on a bore in a tool bar made of cemented carbide a different approach is used, as will be described below with reference to the embodiments shown in FIGS. 5 and 6. However, it will be appreciated that the embodiments shown in FIGS. 5 and 6 are not restricted to tool shanks made of solid carbide but can also be used for tool shanks made of other materials.

Figure 5:
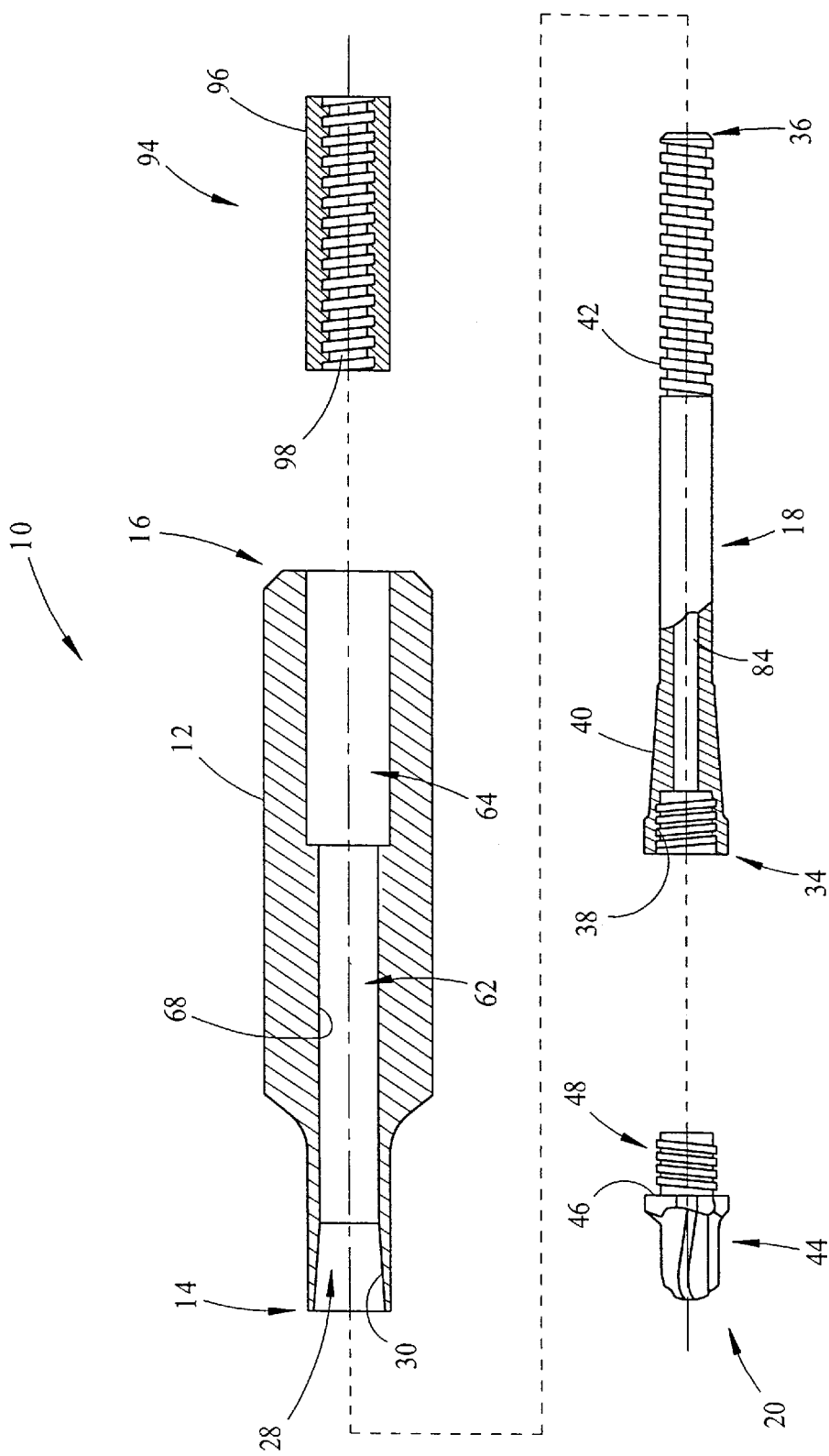
FIG. 5 is a partially sectioned exploded side view of a fourth embodiment of the cutting tool assembly shown in FIG. 1.
Figure 6:
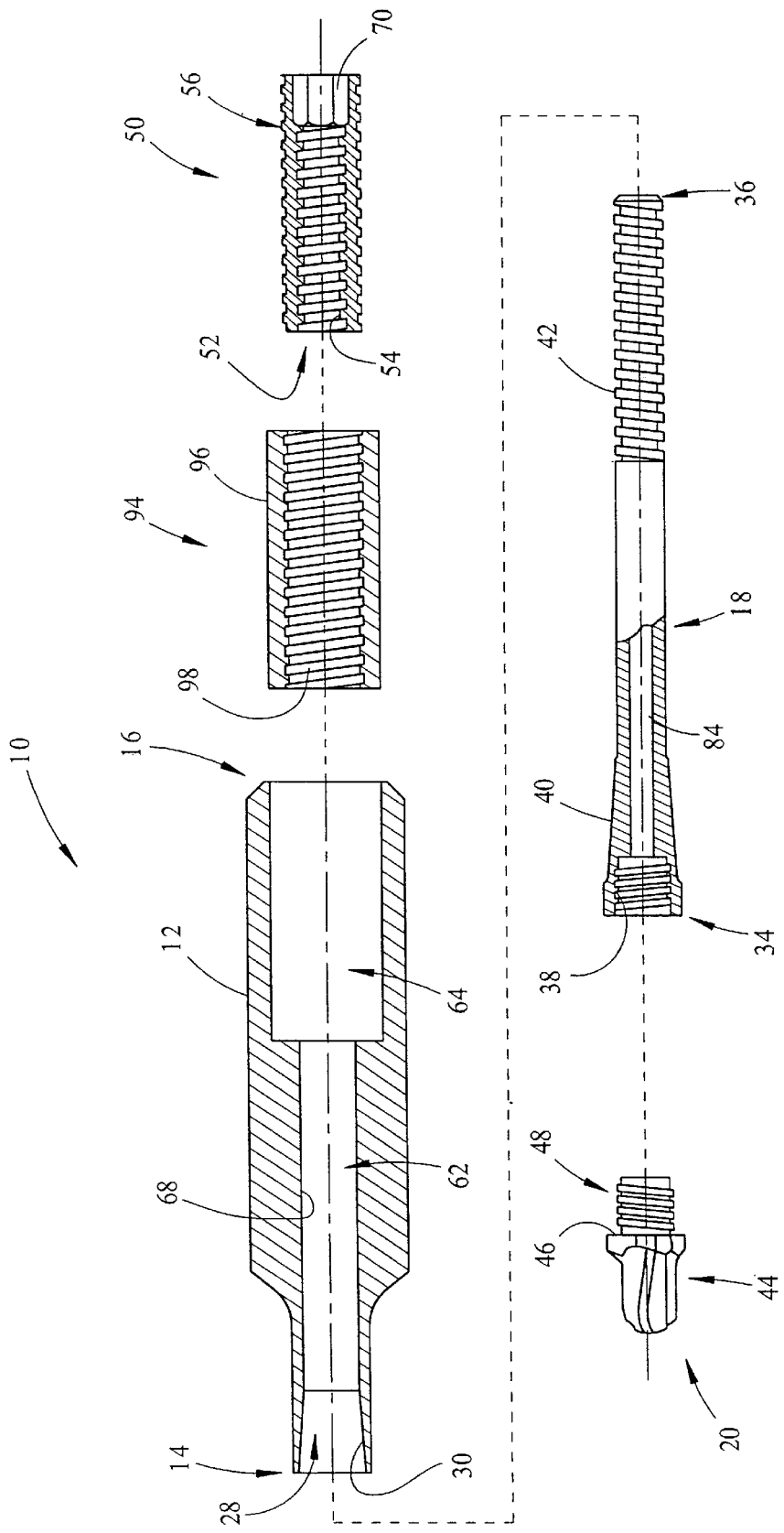
FIG. 6 is a partially sectioned exploded side view of a fifth embodiment of the cutting tool assembly shown in FIG. 1.

Attention is now drawn to FIG. 5 showing a partially sectioned exploded side view of a fourth embodiment of the cutting tool assembly 10 of the present invention. As with the embodiments described above, the elongated support bar 18 is removably retained in a tool shank 12 and the cutting head 20 is removably retained in the elongated support bar 18. In accordance with the fourth embodiment, the cutting tool assembly has a tool shank 12 with an elongated hole 28 extending axially between the forward and rear ends thereof. The elongated hole 28 comprises two portions, a forward portion 62 and a rear portion 64. The forward portion 62 has a conical portion 30 adjacent the forward end 14 of the tool shank 12 and a cylindrical portion 68 extending rearwardly from the conical portion 30. The rear portion 64 of the elongated hole 28 is cylindrical in shape and has a diameter that is preferably larger than the diameter of the cylindrical portion 68 of the forward portion 62.

The cutting tool assembly 10 shown in FIG. 5 further comprises a cylindrical sleeve 94 having a non-threaded external cylindrical surface 96 and an axially extending threaded through bore 98. The cylindrical sleeve 94 is made of a material such as steel in which the threaded through bore 98 can be made without difficulty. The cylindrical sleeve 94 can be retainably mounted in the rear portion 64 of the tool shank 12 either by soldering or by known heat shrink-fit techniques. If soldering is used, the diameter of the cylindrical sleeve 94 should be smaller than the diameter of the rear portion 64 of the elongated hole 28 by, for example, approximately one tenth of a millimeter. If a heat shrink-fit technique is used then the diameter of the cylindrical sleeve 94 should be larger than the diameter of the rear portion 64 of the elongated hole 28 by, for example, a few hundredths of a millimeter. In general terms, a heat shrink-fit technique applied to the present embodiment would involve heating the rear portion 64 of the tool shank 12 until it expands sufficiently to enable the insertion of the cylindrical sleeve 94. The rear portion 64 of the tool shank 12 is then cooled and cylindrical sleeve 94 becomes firmly mounted therein.

After the cylindrical sleeve 94 has been mounted in the rear portion 64 of the elongated hole 28 the elongated support bar 18 can be removably retained in the elongated hole 28 by threadingly engaging the externally threaded portion 42 of the elongated support bar 18 with the threaded through bore 98 of the cylindrical sleeve. The threaded through bore 98 forms a first coupling member of the cutting tool assembly 10, whereas the externally threaded portion 42 of the elongated support bar 18 constitutes a second coupling member of the cutting tool assembly 10. It will be apparent that once the cylindrical sleeve 94 has been mounted in the rear portion 64 of the elongated hole 28, the resulting tool shank 12 of the fourth embodiment is generally equivalent to the tool shank 12 of the first embodiment shown in FIG. 2.

Attention is now drawn to FIG. 6 showing a partially sectioned exploded side view of a fifth embodiment of the cutting tool assembly 10 of the present invention. In accordance with the fifth embodiment, the cutting tool assembly has a tool shank 12 with an elongated hole 28 extending axially between the forward and rear ends thereof. The elongated hole 28 comprises two portions, a forward portion 62 and a rear portion 64. The forward portion 62 has a conical portion 30 adjacent the forward end 14 of the tool shank 12 and a cylindrical portion 68 extending rearwardly from the conical portion 30. The rear portion 64 of the elongated hole 28 is cylindrical in shape and has a diameter that is preferably larger than the diameter of the cylindrical portion 68 of the forward portion 62.

As with the fourth embodiment of the present invention, the cutting tool assembly 10 in accordance with the fifth embodiment shown in FIG. 6 further comprises a cylindrical sleeve 94 having a non-threaded external cylindrical surface 96 and an axially extending threaded through bore 98. The cylindrical sleeve 94 is made of a material such as steel in which the threaded through bore 98 can be made without difficulty. The cylindrical sleeve 94 can be retainably mounted in the rear portion 64 of the elongated hole 28 either by soldering or by heat shrink-fit techniques. If soldering is used, the diameter of the cylindrical sleeve 94 should be smaller than the diameter of the rear portion 64 of the elongated hole 28 by, for example, approximately one tenth of a millimeter. If a heat shrink-fit technique is used then the diameter of the cylindrical sleeve 94 should be larger than the diameter of the rear portion 64 of the elongated hole 28 by, for example, a few hundredths of a millimeter.

In accordance with the fifth embodiment, the cutting tool assembly 10 still further comprises a coupling bar 50 having the form of a bushing with a generally cylindrical shape and an axially extending through bore 52. As with the second embodiment, shown in FIG. 3, the coupling bar 50 has an internally threaded portion 54 having the same thread and internal diameter as the threaded portion 32 of the elongated hole 28 of the tool shank of the first embodiment. Therefore, the internally threaded portion 54 of the coupling bar 50 is capable of threadingly engaging the externally threaded portion 42 of the elongated support bar 18. As previously mentioned, the coupling bar 50 in accordance with the fifth embodiment has an externally threaded surface 56 covering the whole of the coupling bar 50. This feature, of complete external threading, could also be used for the coupling bar 50 in accordance with the second embodiment.

In the assembled cutting tool assembly 10 in accordance with the fifth embodiment of the invention, the cylindrical sleeve 94 is mounted in the rear portion 64 of the elongated hole 28 and the coupling bar 50 is removably retained in the cylindrical sleeve 94 with the externally threaded surface 56 of the coupling bar 50 in threaded engagement with the threaded through bore 98 of the cylindrical sleeve 94. The elongated support bar 18 is removably retained in the elongated hole 28 of the tool shank 12 with the externally threaded portion 42 in threaded engagement with the internally threaded portion 54 of the coupling bar 50 and at least a section of the conical portion 40 of the elongated support bar 18 in abutment with the conical portion 30 of the elongated hole 28. The cutting head 20 is removably retained in the elongated support bar 18 with the rear threaded portion 48 in threaded engagement with the threaded bore 38 in the forward end of the support bar 18.

In both the second and fifth embodiments, the internal thread on the internally threaded portion 54 and the external thread on the externally threaded surface 56 have different lead angles. Typically, the lead angle of the internal thread is greater than the lead angle of the external thread.

Although the present invention has been described to a certain degree of particularity, it should be understood that various alterations and modifications can be made without departing from the spirit or scope of the invention as hereinafter claimed.

What is claimed is:

1. A cutting tool assembly comprising:
   a tool shank having a forward end, a rear end and a longitudinal axis (A) passing through the forward and rear ends, an elongated hole extending axially from the forward end of the tool shank, adjacent the forward end of the tool shank the elongated hole having a conical portion, the tool shank having a first coupling member adjacent the rear end thereof;

an elongated support bar having a forward end and a rear end, with a threaded bore extending axially rearwardly from the forward end of the elongated support bar, the elongated support bar having a conical portion rearward of the forward end thereof, the elongated support bar having a second coupling member adjacent the rear end thereof, the elongated support bar being removably retained in the elongated hole of the tool shank with the first coupling member coupled to the second coupling member and with at least a section of the conical portion of the elongated support bar being in abutment with the conical portion of the elongated hole; and a cutting head having a forward cutting portion and a rear threaded portion; the rear threaded portion of the cutting head being threadingly engaged with the threaded bore in the forward end of the elongated support bar.

2. The cutting tool assembly according to claim 1, wherein:

the tool shank's elongated hole has a threaded portion adjacent the rear end thereof;

the elongated support bar has an externally threaded portion adjacent the rear end thereof; and the elongated support bar is removably retained in the tool shank's elongated hole with the externally threaded portion of the elongated support bar threadingly engaged with the threaded portion of the elongated hole; wherein the threaded portion of the tool shank's elongated hole forms the first coupling member and the externally threaded portion of the elongated support bar forms the second coupling member.

3. The cutting tool assembly according to claim 1, further comprising:

a coupling bar generally cylindrically shaped, the coupling bar having an externally threaded surface and an axially extending through bore with an internally threaded portion, wherein:

the elongated hole has a threaded portion adjacent the rear end of the tool shank;

the coupling bar is removably retained in the tool shank's elongated hole adjacent the rear end thereof with the externally threaded surface of the coupling bar threadingly engaged with the threaded portion of the tool shank's elongated hole;

the elongated support bar has an externally threaded portion adjacent the rear end thereof, the elongated support bar being removably retained in the tool shank's elongated hole with the externally threaded portion of the elongated support bar threadingly engaged with the internally threaded portion of the coupling bar; and the internally threaded portion of the coupling bar forms the first coupling member and the externally threaded portion of the elongated support bar forms the second coupling member.

4. The cutting tool assembly according to claim 1, wherein:

the tool shank has a threaded through bore passing through a section of the tool shank;

the threaded through bore extends from a side opening in the tool shank to the tool shank's elongated hole;

the elongated support bar is removably retained in the tool shank's elongated hole by a securing screw threadingly retained in the threaded through bore;

the securing screw engages a locking recess formed in the elongated support bar; and the securing screw forms the first coupling member and the locking recess of the elongated support bar forms the second coupling member.

5. The cutting tool assembly according to claim 1, wherein:

the elongated support bar is provided with a coolant channel for conducting a coolant fluid, the coolant channel extending axially from the rear end to the forward end of the elongated support bar, and the cutting head is provided with a coolant channel extending through the rear threaded portion thereof and exiting the cutting head at exit openings formed in the forward cutting portion thereof.

6. The cutting tool assembly according to claim 1, further comprising:

a cylindrical sleeve having a non-threaded external cylindrical surface and an axially extending threaded through bore, the cylindrical sleeve being mounted in a cylindrically shaped rear portion of the tool shank's elongated hole; wherein:

the elongated support bar is removably retained in the tool shank's elongated hole with an externally threaded portion of the elongated support bar being in threaded engagement with the cylindrical sleeve's threaded through bore; and the cylindrical sleeve's threaded through bore forms the first coupling member and the externally threaded portion of the elongated support bar forms the second coupling member.

7. The cutting tool assembly according to claim 6, wherein the tool shank is made of cemented carbide.

8. The cutting tool assembly according to claim 7, wherein the cylindrical sleeve is mounted in the tool shank by a heat shrink-fit technique.

9. The cutting tool assembly according to claim 7, wherein the cylindrical sleeve is mounted in the tool shank by soldering.

10. The cutting tool assembly according to claim 1, further comprising:

a cylindrical sleeve having a non-threaded external cylindrical surface and an axially extending threaded through bore, the cylindrical sleeve being mounted in a cylindrically shaped rear portion of the tool shank's elongated hole; and a coupling bar having an externally threaded surface and an axially extending through bore provided with an internally threaded portion, the coupling bar being removably retained in the cylindrical sleeve with the externally threaded surface of the coupling bar in threaded engagement with the cylindrical sleeve's threaded through bore; wherein:

the elongated support bar is removably retained in the tool shank's elongated hole with an externally threaded portion of the elongated support bar being in threaded engagement with the internally threaded portion of the coupling bar; and the internally threaded portion of the coupling bar forms the first coupling member and the externally threaded portion of the elongated support bar forms the second coupling member.

11. The cutting tool assembly according to claim 10, wherein the tool shank is made of cemented carbide.

12. The cutting tool assembly according to claim 11, wherein the cylindrical sleeve is mounted in the tool shank by a heat shrink-fit technique.

13. The cutting tool assembly according to claim 11, wherein the cylindrical sleeve is mounted in the tool shank by soldering.

14. The cutting tool assembly according any one of the preceding claims, wherein the cutting head is made of cemented carbide.

15. A cutting tool assembly comprising:
- a tool shank having a forward end, a rear end and a longitudinal axis (A) passing through the forward and rear ends, an elongated hole extending axially from the forward end of the tool shank, the tool shank having a first coupling member adjacent the rear end thereof;
- an elongated support bar having a forward end and a rear end, with a threaded bore extending axially rearwardly from the forward end of the elongated support bar, the elongated support bar having a second coupling member adjacent the rear end thereof, the elongated support bar being removably retained in the elongated hole of the tool shank with the first coupling member coupled to the second coupling member;
- a cylindrical sleeve having a non-threaded external cylindrical surface and an axially extending threaded through bore, the cylindrical sleeve being mounted in a cylindrically shaped rear portion of the tool shank's elongated hole; wherein:
  - the elongated support bar is removably retained in the tool shank's elongated hole with an externally threaded portion of the elongated support bar being in threaded engagement with the cylindrical sleeve's threaded through bore; and
  - the cylindrical sleeve's threaded through bore forms the first coupling member and the externally threaded portion of the elongated support bar forms the second coupling member.

16. The cutting tool assembly according to claim 15, wherein the tool shank is made of cemented carbide.

17. The cutting tool assembly according to claim 16, wherein the cylindrical sleeve is mounted in the tool shank by a heat shrink-fit technique.

18. A cutting tool assembly comprising:
- a tool shank having a forward end, a rear end and a longitudinal axis (A) passing through the forward and rear ends, an elongated hole extending axially from the forward end of the tool shank, the tool shank having a first coupling member adjacent the rear end thereof,
- an elongated support bar having a forward end and a rear end, with a threaded bore extending axially rearwardly from the forward end of the elongated support bar, the elongated support bar having a second coupling member adjacent the rear end thereof, the elongated support bar being removably retained in the elongated hole of the tool shank with the first coupling member coupled to the second coupling member;
- a cylindrical sleeve having a non-threaded external cylindrical surface and an axially extending threaded through bore, the cylindrical sleeve being mounted in a cylindrically shaped rear portion of the tool shank's elongated hole; and
- a coupling bar having an externally threaded surface and an axially extending through bore provided with an internally threaded portion, the coupling bar being removably retained in the cylindrical sleeve with the externally threaded surface of the coupling bar in threaded engagement with the cylindrical sleeve's threaded through bore; wherein:
  - the elongated support bar is removably retained in the tool shank's elongated hole with an externally threaded portion of the elongated support bar being in threaded engagement with the internally threaded portion of the coupling bar; and
  - the internally threaded portion of the coupling bar forms the first coupling member and the externally threaded portion of the elongated support bar forms the second coupling member.

19. The cutting tool assembly according to claim 18, wherein the tool shank is made of cemented carbide.

20. The cutting tool assembly according to claim 19, wherein the cylindrical sleeve is mounted in the tool shank by a heat shrink-fit technique.

* * * * *